United States Patent [19]
Braun

[11] Patent Number: 6,089,252
[45] Date of Patent: Jul. 18, 2000

[54] MANIFOLD FOR AUXILIARY FUEL TANK

[75] Inventor: David Laurence Braun, Phoenix, Ariz.

[73] Assignee: Robertson Aviation LLC, Tempe, Ariz.

[21] Appl. No.: 09/097,949

[22] Filed: Jun. 16, 1998

[51] Int. Cl.$^7$ ........................................................ F17D 1/14
[52] U.S. Cl. ............................ 137/263; 137/266; 137/884
[58] Field of Search ................................. 137/263, 266, 137/267, 572, 884

[56] References Cited

U.S. PATENT DOCUMENTS

| | | | |
|---|---|---|---|
| 1,283,228 | 10/1918 | Le Bozec | 137/263 |
| 2,394,431 | 2/1946 | Curtis et al. | 137/263 |
| 2,535,094 | 12/1950 | Samiran | 137/266 X |
| 2,926,688 | 3/1960 | Muma et al. | 137/263 |
| 2,966,921 | 1/1961 | Whiteman | 137/266 X |
| 3,060,998 | 10/1962 | Bell et al. | 137/266 X |
| 4,556,077 | 12/1985 | Peyton | 137/266 X |
| 4,591,115 | 5/1986 | DeCarlo | 137/266 X |
| 5,555,873 | 9/1996 | Nolen | 137/267 X |
| 5,704,387 | 1/1998 | Sims | 137/263 |

*Primary Examiner*—John Rivell
*Attorney, Agent, or Firm*—Parsons & Goltry; Robert A. Parsons; Michael W. Goltry

[57] ABSTRACT

A fuel manifold includes a manifold block having a first port adapted to be connected to a main fuel tank, a second port adapted to be connected to an input connection of an auxiliary fuel tank, and a third port adapted to be connected to an output connection of the auxiliary fuel tank. A first channel in the manifold block couples the first port to the second port. A second channel couples the third port to the first channel and includes a check valve for permitting fuel to flow only from the third port to the first channel. A valve is coupled between the second port and the auxiliary fuel tank. The fuel manifold may further include a fourth port adapted to be coupled to the second main fuel tank. A third channel in the manifold block couples the fourth port to the third port. The fuel manifold further includes a constriction fitting attached to the manifold block for attaching a gas (nitrogen) line from the auxiliary fuel tank.

14 Claims, 3 Drawing Sheets

MANIFOLD FOR AUXILIARY FUEL TANK

BACKGROUND OF THE INVENTION

This invention relates to auxiliary fuel systems and, in particular, to a fuel manifold for a crashworthy, auxiliary fuel system for a helicopter.

Auxiliary fuel tanks have long been used to extend the range of a helicopter and other aircraft or to provide refueling capability at a remote location. Depending upon the size and type of helicopter, auxiliary fuel tanks have been located in pods outside the helicopter, under seats, in cargo bays, and elsewhere. For some applications, e.g. surveillance or patrol, an added fuel tank may be an essentially permanent installation. For rescue or other operations, it is desirable that an auxiliary fuel tank be easily installed or removed in order to re-configure a helicopter as quickly as possible; e.g. in ten minutes or less.

Adding an auxiliary fuel tank is not merely a matter of attaching the necessary components and tapping into the existing fuel system of the aircraft. All existing structures and systems are designed to meet minimum requirements for airworthiness. Thus, one cannot simply cut or drill into a bulkhead to mount an auxiliary fuel tank. Ideally, an auxiliary fuel system will require no modification of the airframe and minimal changes to existing fuel systems.

A problem with many auxiliary fuel systems in the prior art is that the system is not crashworthy. As used herein, a "crashworthy" fuel system is one that will not have dangerous spillage of fuel when subjected to an upper limit, survivable crash.

The conflicting requirements of crashworthiness and ease of installation or removal are difficult to meet simultaneously. An existing modification of an Apache helicopter includes auxiliary fuel tanks on the outside of the craft wherein the tanks are normally vented to atmosphere and pressurized with air for fuel transfer to main tanks. (The main fuel system in an Apache helicopter is nitrogen filled).

In view of the foregoing, it is therefore an object of the invention to provide a fuel manifold that does not require modification of an airframe.

Another object of the invention is to provide a manifold that is compatible with nitrogen filled fuel tanks.

A further object of the invention is to provide a compact manifold that can remain in the aircraft when the auxiliary fuel tank is removed and that does not interfere with other uses of the space for the auxiliary fuel tank, such as storing an ammunition magazine, or interfere with the normal operation of the main fuel system or other aircraft systems.

Another object of the invention is to provide a manifold that is quickly and easily connected to an auxiliary fuel tank.

SUMMARY OF THE INVENTION

The foregoing objects are achieved in this invention in which the fuel manifold includes a manifold block having a first port adapted to be connected to a main fuel tank, a second port adapted to be connected to an input connection of an auxiliary fuel tank, and a third port adapted to be connected to an output connection of the auxiliary fuel tank. A first channel in the manifold block couples the first port to the second port. A second channel in the manifold block couples the third port to the first channel. A check valve located in the second channel permits fuel to flow only from the third port to the first channel. A valve is coupled between the second port and the auxiliary fuel tank for selectively blocking the path to the auxiliary fuel tank. If the main fuel supply in an aircraft includes a second fuel tank, the fuel manifold further includes a fourth port adapted to be coupled to the second main fuel tank. A third channel in the manifold block couples the fourth port to the third port. The manifold further includes a constriction fitting attached to the manifold block for attaching a gas (nitrogen) line from the auxiliary fuel tank, thereby locating gas, fuel, and electrical connections on the manifold block instead of on a separate mounting for each group of connections.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
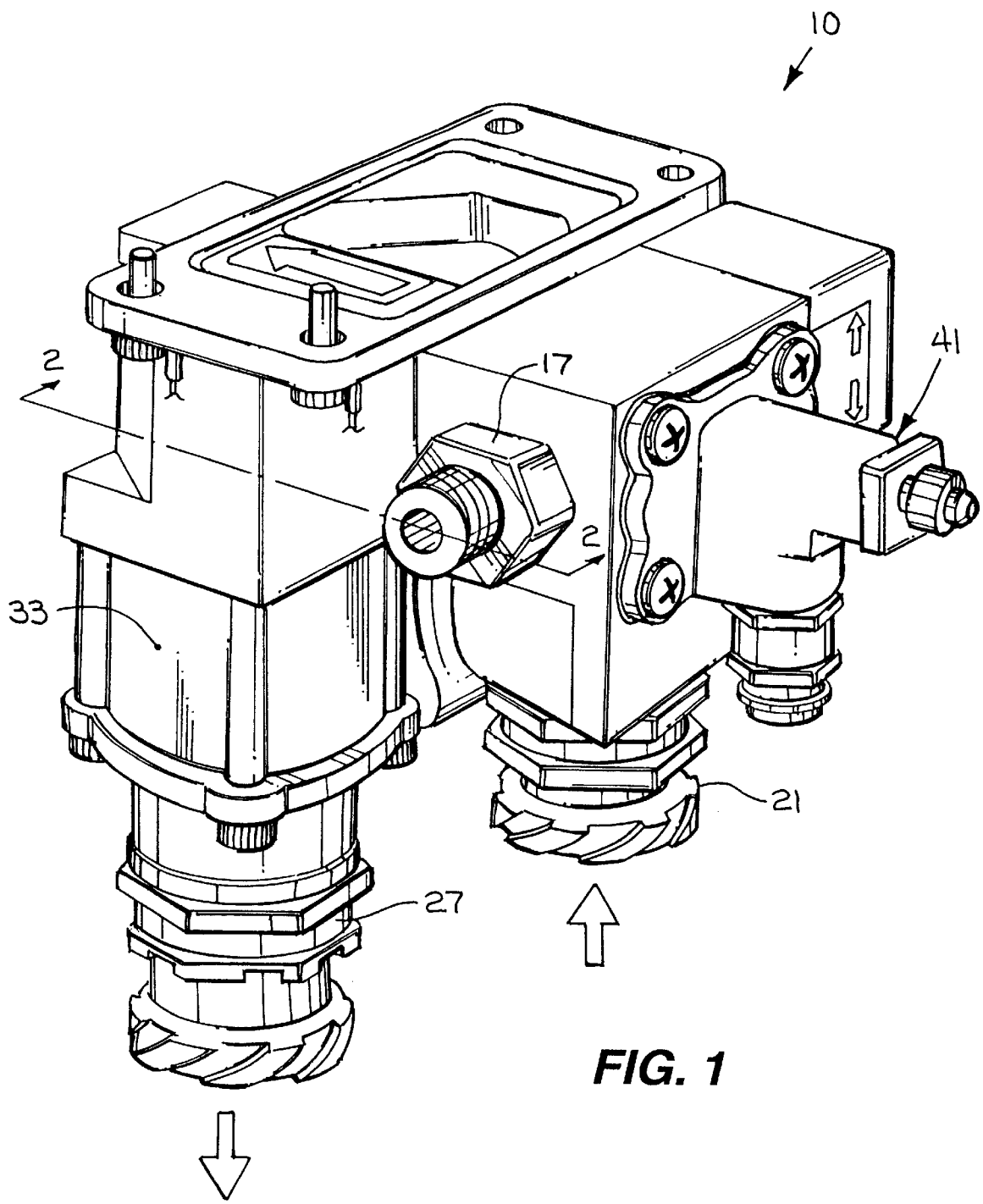
FIG. 1 is a perspective view of a manifold constructed in accordance with a preferred embodiment of the invention.
Figure 2:
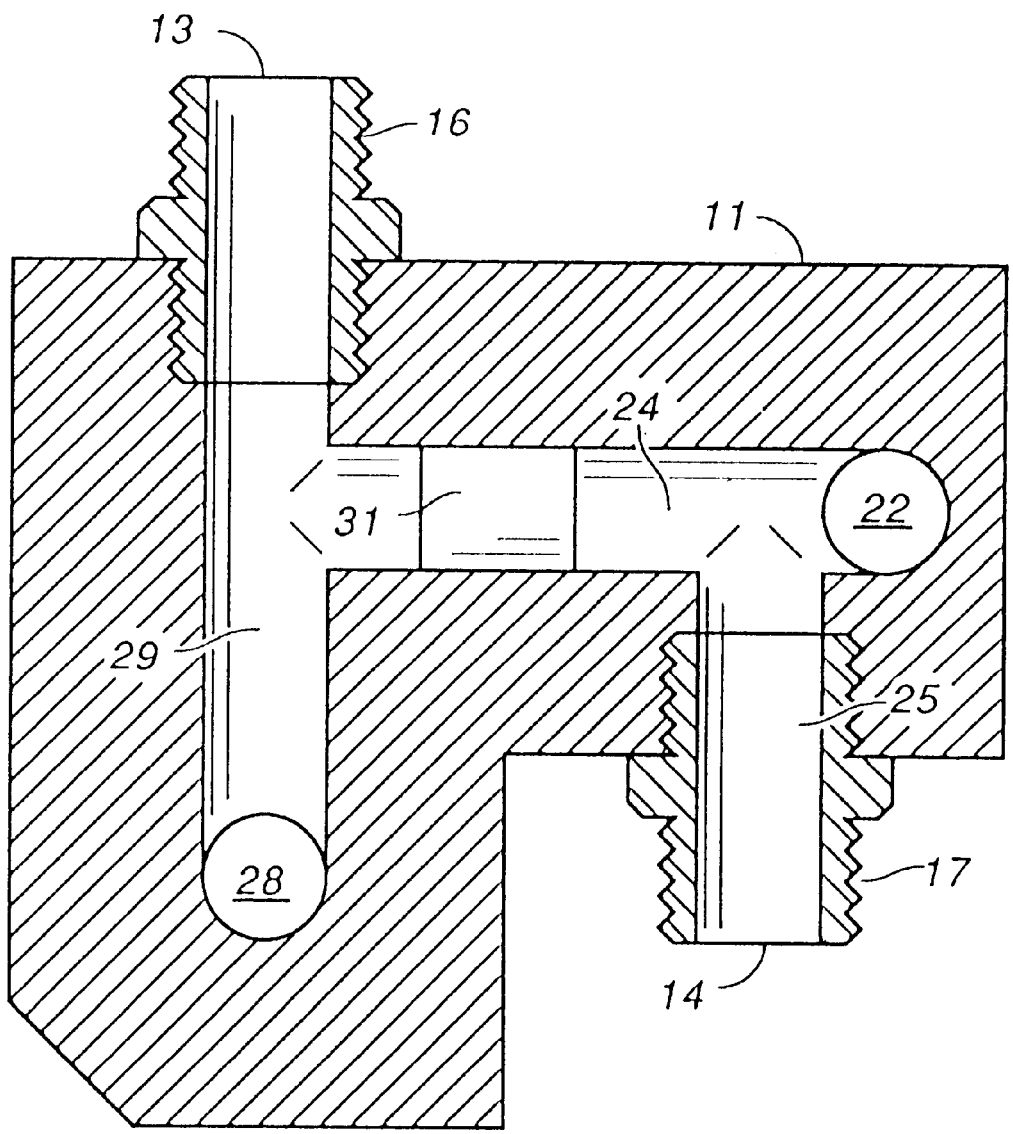
FIG. 2 is a cross-section taken along line 2—2 in FIG. 1.

Referring to FIGS. 1 and 2, manifold 10 includes port 13 for coupling the manifold to a first fuel tank (not shown) and port 14 (not visible in FIG. 1) for coupling the manifold to a second fuel tank, e.g. of a helicopter. Fitting 16 is threaded into manifold block 11 and provides a permanent connection to the manifold for a hose (not shown) extending to the first fuel tank. Fitting 17 is threaded into manifold block 11 and provides a permanent connection for a hose (not shown) extending to the second fuel tank. The connections are permanent in the sense that, once manifold 10 is installed in an aircraft, these connections are not opened unless the manifold is to be removed.

Coupling 21 (FIG. 1) is attached to another port of manifold 10, shown in FIG. 2 as bore 22. Coupling 21 is a safety coupling known in the art and includes a built-inn valve (not shown) for preventing fuel from flowing out of manifold 10 if the coupling is not attached to a mating coupling on a hose (not shown). Coupling 21 is connected by hose to a supply port of an auxiliary fuel tank for receiving fuel from the auxiliary tank. Within manifold 10, bore 22 is coupled to port 14 without restriction by channel 25.

Coupling 27 (FIG. 1) is attached to yet another port of manifold 10, shown in FIG. 2 as bore 28. Coupling 27 is also a safety coupling and includes a built-in valve (not shown) for preventing fuel from flowing out of manifold 10 if the coupling is not attached to a mating coupling (not shown). Coupling 27 is connected by a hose (not shown) to a fill port of an auxiliary fuel tank for supplying fuel to the auxiliary tank. Within manifold 10, bore 28 is coupled to port 13 without restriction by channel 29.

Check valve 31 is located in channel 24 and permits fuel to flow in only one direction, from bore 22 to channel 29. Valve 33 (FIG. 1) is located between coupling 27 and bore 28 and, when closed, blocks the flow of fuel in either direction. Valve 33, which is preferably a motorized ball valve, is closed to prevent fuel from re-entering the auxiliary tank while transferring fuel from the auxiliary tank to the main tanks of the aircraft.

Couplings 21 and 27 extend in the same direction from manifold 10 and are connected to an auxiliary tank (not shown) by short lengths of hose. Fittings 16 and 17 extend in orthogonal directions from couplings 21 and 27 to provide compact, yet readily accessible connections to the fuel system in the aircraft. Fittings 16 and 17 are also well separated from one another in visually distinct portions of the manifold, which minimizes the chance that someone would interchange the connections to the fittings.

Referring to FIG. 1, elbow 41 is attached to one side of manifold block 11 and contains a constriction for controlling the flow of nitrogen to an auxiliary fuel tank. The attachment provides a unitary structure that locates gas (nitrogen), fuel, and electrical connections to one, compact location with a single attachment rather than several. This construction facilitates placing manifold 10 in a location using existing space and existing holes for attachment within the typically crowded interior of an airframe.

Manifold 10 is attached to a bulkhead in the aircraft by top plate 13. In plate 13, a plurality of holes, such as holes 14 and 15, exactly match existing holes in the bulkhead. Bolts, such as bolts 17 and 18, are located in each hole for securing manifold 10 to the bulkhead. Thus, a manifold constructed in accordance with the invention requires no modification of the airframe.

Figure 3:
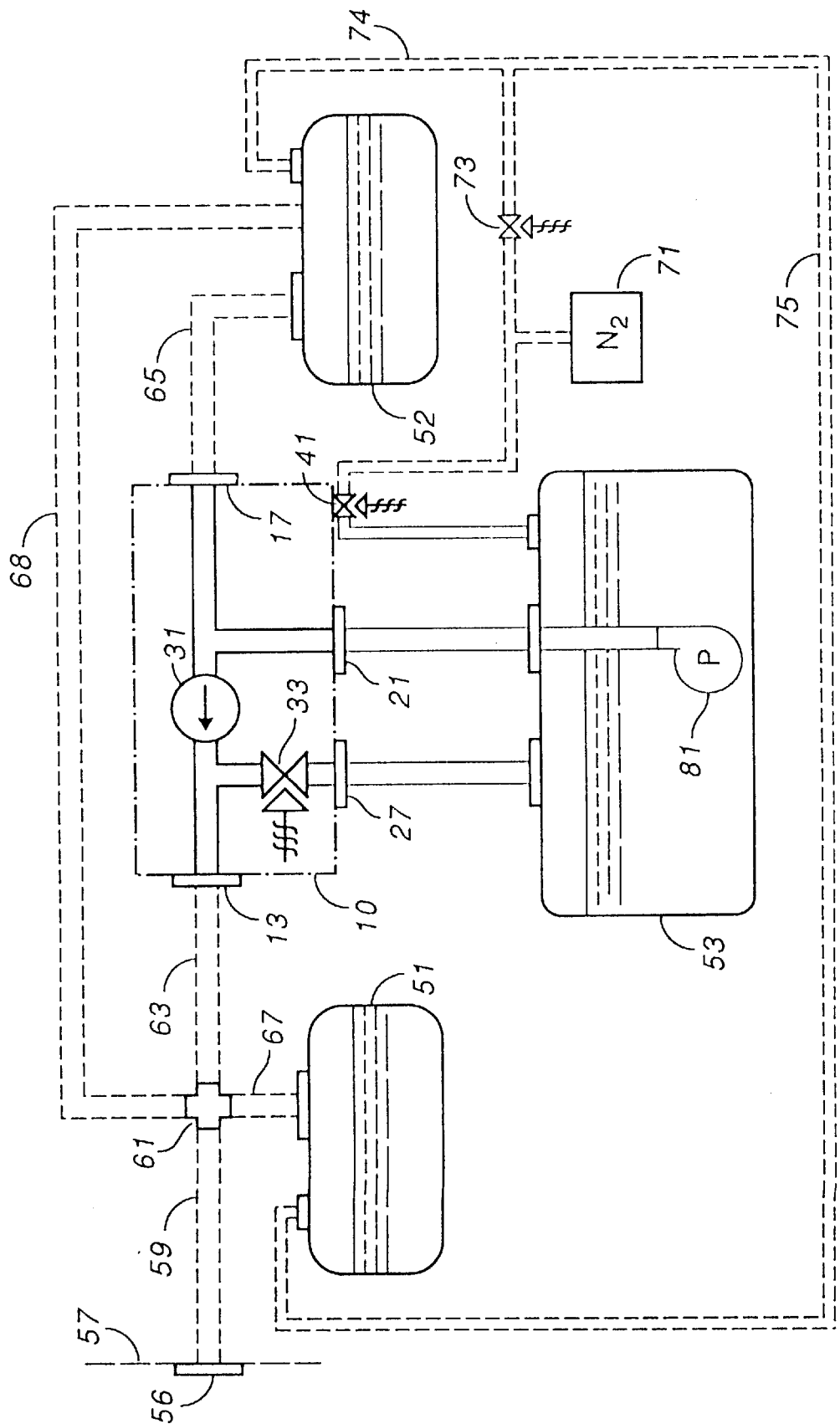
FIG. 3 illustrates the flow of fuel through the manifold of FIG. 1.

FIG. 3 illustrates the operation of manifold 10 in controlling the flow of fuel among front fuel tank 51, rear fuel tank 52, and auxiliary fuel tank 53. Fuel filler coupling 56 in outside wall 57 of the aircraft is coupled by hose 59 through X-coupling 61 to front fuel tank 51 and through transfer pump 62 to rear fuel tank 52. Fuel is also supplied from X-coupling 61 to fitting 16 of manifold 10. Fitting 17 of manifold 10 is connected to rear fuel tank 52 by hose 65.

During initial fueling, fuel flows through coupling 56 to front tank 51 through hose 59, X-coupling 61, and hose 67, and flows to rear tank 52 through hose 59, X-coupling 61, pump 62, and hose 68. Valve 33 is opened for fueling and fuel flows from X-coupling 61 through valve 33 to auxiliary fuel tank 53. All three fuel tanks include appropriate sensors, known in the art, to prevent overfilling. Any gas or gaseous mixture in the tanks is vented to atmosphere through suitable valves (not shown).

During initial flight, the main fuel system operates normally while manifold 10 and auxiliary fuel tank 53 do nothing. In flight, the reversible pump 62 in hose 68 can be used to balance fuel quantities in front and rear tanks. When pump 62 is turned off, it prevents fuel flow through hose 68. As fuel is drained from tanks 51 and 52, the volume is replaced by nitrogen from nitrogen generator 71 through three way valve 72, gas line 74, and gas line 75. At some point in the flight, the pilot will throw a switch (not shown) to transfer fuel from auxiliary fuel tank 53 to front fuel tank 51 and rear fuel tank 52. The switch actuates valve 72 to open line 73 and block line 74. The switch also closes solenoid valve 33 and turns on pump 81. Fuel flows from auxiliary tank 53 through check valve 31 to front tank 51 and through hose 65 to rear tank 52. Reversible pump 62 is turned off and provides fuel by-pass flow through hose 68.

The volume of fuel removed from auxiliary tank 53 is replaced by nitrogen from generator 71. The nitrogen in front fuel tank 51 and rear fuel tank 52 is vented to atmosphere. The main fuel tanks may not fill completely because fuel is being consumed. What the pilot sees is that fuel seems to be consumed more slowly than before the transfer began. When auxiliary fuel tank 53 is empty, pump 81 shuts off automatically, which also closes valve 33 and switches valve 72 to block line 73 and open line 74.

The invention thus provides a fuel manifold that does not require modification of an airframe and is compatible with nitrogen filled fuel tanks. The manifold is physically compact and remains in the aircraft when the auxiliary fuel tank is removed. The manifold does not interfere with other uses of the space for the auxiliary fuel system or interfere with the normal operation of the main fuel system or other aircraft systems. The manifold is quickly and easily connected to an auxiliary fuel tank and, in the event of a crash, the safety couplings prevent loss of fuel should the connections be broken.

Having thus described the invention, it will be apparent to those of skill in the art that various modifications can be made within the scope of the invention. For example, a manifold constructed in accordance with the invention can be used with more than one auxiliary fuel tank and with one or more main fuel tanks. The orientation of the fittings and couplings can be varied from the particular orientation shown in order to suit a particular aircraft. The invention can be used with gases or gas mixtures other than nitrogen. While illustrated as an elbow fitting containing a construction, any fitting in the gas delivery system can be attached to the manifold block.

What is claimed as the invention is:

1. A fuel manifold for connecting an auxiliary fuel tank to the main fuel tank of an aircraft, said manifold comprising:
   a manifold block defining first, second, and third ports, wherein said first port is adapted to be connected to said main fuel tank, said second port is adapted to be connected to an input connection of said auxiliary fuel tank, and said third port is adapted to be connected to an output connection of said auxiliary fuel tank;
   a first channel in said manifold block coupling said first port to said second port;
   a second channel in said manifold block coupling said third port to said first channel; and
   a check valve located in said second channel for permitting fuel to flow only from said third port to said first channel, thereby permitting said main fuel tank to be filled from said auxiliary fuel tank.

2. The fuel manifold as set forth in claim 1 and further comprising:
   a valve coupled to said second port for selectively blocking the flow of fuel between said second port and said auxiliary fuel tank.

3. The fuel manifold as set forth in claim 1 and further comprising:
   a fourth port adapted to be coupled to a second main fuel tank;
   a third channel in said manifold block coupling said fourth port to said third port.

4. The fuel manifold as set forth in claim 3 and further comprising:
   a valve coupled to said second port for selectively blocking the flow of fuel between said second port and said auxiliary fuel tank.

5. The fuel manifold as set forth in claim 4 and further including a constriction fitting attached to said manifold block for attaching a gas line from the auxiliary fuel tank, whereby gas, fuel, and electrical connections are all located about said manifold block.

6. The fuel manifold as set forth in claim 3 and further comprising:
   a first fitting attached to said first port;
   a second fitting attached to said fourth port;
   a first coupling attached to said second port;
   a second coupling attached to said third port;

wherein said first coupling and said second coupling extend in a first direction from said manifold block and said first fitting and said second fitting extend from said manifold block in directions orthogonal to said first direction.

7. The fuel manifold as set forth in claim 1 and further comprising:

a first fitting attached to said first port;

a first coupling attached to said second port;

a second coupling attached to said third port;

wherein said first coupling and said second coupling extend in a first direction from said manifold block and said first fitting extends from said manifold block in a second direction, orthogonal to said first direction.

8. A fuel system for an aircraft, said fuel system comprising:

a first fuel tank having an inlet connection;

an auxiliary fuel tank having an inlet connection and an outlet connection;

a manifold block defining first, second, and third ports, wherein said first port is connected to said inlet connection of said main fuel tank, said second port is connected to said input connection of said auxiliary fuel tank, and said third port is connected to the output connection of said auxiliary fuel tank;

a first channel in said manifold block coupling said first port to said second port;

a second channel in said manifold block coupling said third port to said first channel; and a check valve located in said second channel for permitting fuel to flow only from said third port to said first channel, thereby permitting said main fuel tank to be filled from said auxiliary fuel tank.

9. The fuel system as set forth in claim 8 and further comprising:

a valve coupled to said second port for selectively blocking the flow of fuel between said second port and said auxiliary fuel tank.

10. The fuel system as set forth in claim 8 and further comprising:

a fourth port coupled to a second fuel tank; and a third channel in said manifold block coupling said fourth port to said third port.

11. The fuel system as set forth in claim 10 and further comprising:

a valve coupled to said second port for selectively blocking the flow of fuel between said second port and said auxiliary fuel tank.

12. The fuel system as set forth in claim 11 and further including a constriction fitting attached to said manifold block for attaching a gas line from the auxiliary fuel tank, whereby gas, fuel, and electrical connections are all located about said manifold block.

13. The fuel system as set forth in claim 10 and further comprising:

a first fitting attached to said first port;

a second fitting attached to said fourth port;

a first coupling attached to said second port;

a second coupling attached to said third port; and wherein said first coupling and said second coupling extend in a first direction from said manifold block and said first fitting and said second fitting extend from said manifold block in directions orthogonal to said first direction.

14. The fuel manifold as set forth in claim 8 and further comprising:

a first fitting attached to said first port;

a first coupling attached to said second port; and a second coupling attached to said third port;

wherein said first coupling and said second coupling extend in a first direction from said manifold block and said first fitting extends from said manifold block in a second direction, orthogonal to said first direction.

* * * * *